US011050830B1

(12) United States Patent
Aziz et al.

(10) Patent No.: US 11,050,830 B1
(45) Date of Patent: Jun. 29, 2021

(54) SMART REAL-TIME PREDICTION SYSTEM FOR POWER TRANSMISSION

(71) Applicant: UNITED ARAB EMIRATES UNIVERSITY, Al Ain (AE)

(72) Inventors: Muthanna Ahmed Aziz, Al Ain (AE); Waleed Khalil Ahmed, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/069,845

(22) Filed: Oct. 13, 2020

(51) Int. Cl.
| | |
|---|---|
| *H02J 3/14* | (2006.01) |
| *G06F 1/32* | (2019.01) |
| *H04L 29/08* | (2006.01) |
| *F16D 7/04* | (2006.01) |
| *H04L 9/06* | (2006.01) |
| *G05D 17/02* | (2006.01) |

(52) U.S. Cl.
CPC ............ *H04L 67/125* (2013.01); *F16D 7/044* (2013.01); *G05D 17/02* (2013.01); *H04L 9/0643* (2013.01); *F16D 2300/18* (2013.01); *H04L 2209/38* (2013.01)

(58) Field of Classification Search
CPC .......... H01H 61/02; H01H 9/32; H02H 7/262; H02H 3/006; H02J 13/00004; H02J 13/00034; H02J 13/00036; H02J 13/0004; H02J 13/0075; H02J 13/0079; H02J 3/14; H02J 2310/12; Y02B 70/3225; Y02B 90/20; Y04S 20/222; Y04S 40/126
USPC .................................................. 370/318, 329
See application file for complete search history.

(56) References Cited

U.S. PATENT DOCUMENTS

| | | | |
|---|---|---|---|
| 10,195,513 B2 | 2/2019 | Tran et al. | |
| 2005/0207081 A1* | 9/2005 | Ying ................... | H02J 13/0004 361/105 |
| 2018/0326291 A1* | 11/2018 | Tran ....................... | H04L 9/321 |

FOREIGN PATENT DOCUMENTS

| | | |
|---|---|---|
| CN | 102176684 A | 9/2011 |
| CN | 202033010 U | 11/2011 |

(Continued)

OTHER PUBLICATIONS

Bertelsen, "Flexible alignment monitoring on the go", (2016), published at www.wartsila.com/twentyfour7-site/in-detail/flexible-alignment-monitoring-on-the . . . , 10 pages.

(Continued)

*Primary Examiner* — Melvin C Marcelo
*Assistant Examiner* — Natali Pascual Peguero
(74) *Attorney, Agent, or Firm* — Nath, Goldberg & Meyer; Richard C. Litman

(57) ABSTRACT

Monitoring and control of power or drive couplings in mechanical drive systems is performed using sensors at an interface of the coupling and an overload disengagement component at the coupling. A local sensor and actuation module having a wireless communication port receives signals from the sensors and uses the signals to monitoring a load on the drive coupling. An overload disengagement circuit responsive to the monitored load and provides a disconnect signal responsive to a sensed overload condition, and communicates with the local sensor and actuation module using an Internet of Things (IoT) link, using a blockchain enablement protocol. The local sensor and actuation module provide an override capability in the event of a communication failure of the IoT link.

6 Claims, 4 Drawing Sheets

(56) References Cited

FOREIGN PATENT DOCUMENTS

| | | |
|---|---|---|
| CN | 109813480 A | 5/2019 |
| CN | 109921736 A | 6/2019 |
| WO | 2017166825 A1 | 10/2017 |

OTHER PUBLICATIONS

Jo et al., "Hybrid Blockchain and Internet-of-Things Network for Underground Structure Health Monitoring" Sensors (2018), vol. 18, No. 12, 4268, 18 pages.

\* cited by examiner

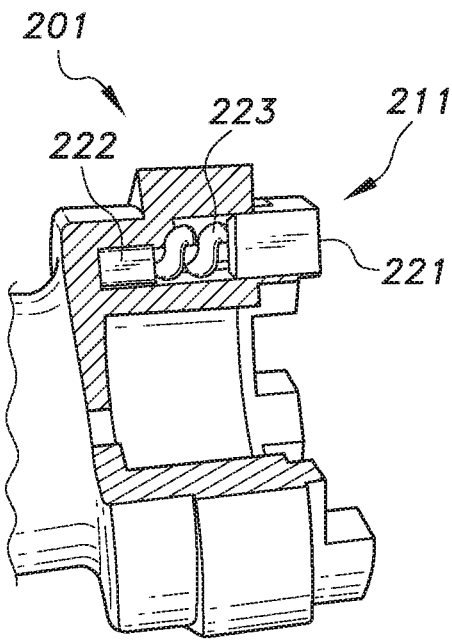
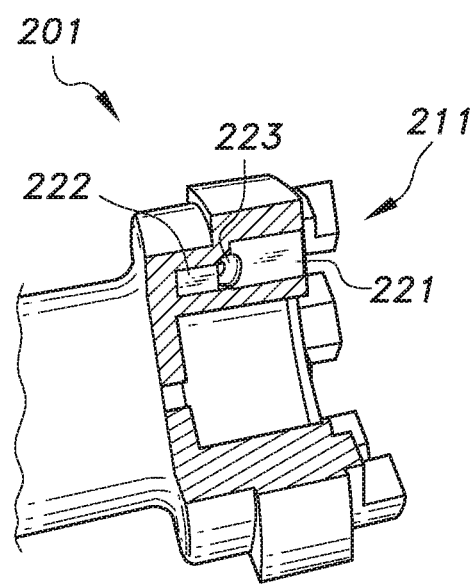
FIG. 2A  FIG. 2B
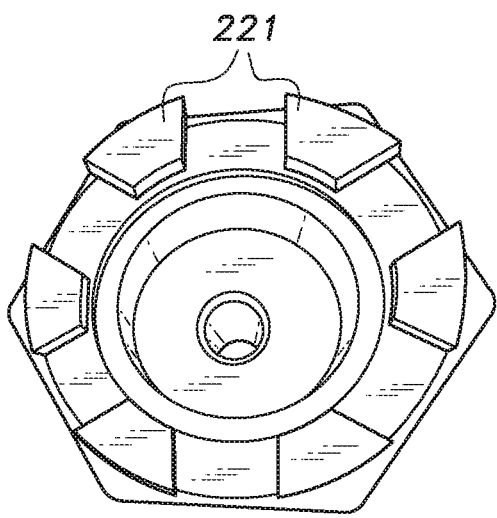
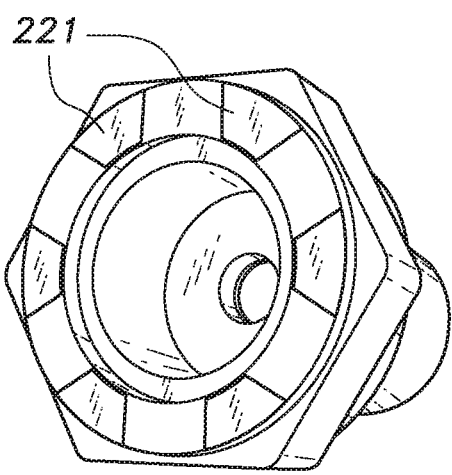
FIG. 2C  FIG. 2D

SMART REAL-TIME PREDICTION SYSTEM FOR POWER TRANSMISSION

BACKGROUND

1. Field

The disclosure of the present patent application relates to predictive maintenance systems and techniques for power transmission in mechanical systems, and particularly to a smart real-time prediction system for power transmission.

2. Description of the Related Art

In precision and sensitive systems, such as systems used for aerospace, defense, nuclear, and petroleum applications, there is little or no tolerance for errors that can generate a temporary shutdown and may even cause breakdown. One of the sources of these errors is an unpredictable overload in the power transmission process. Unfortunately, existing systems have weak points, such as may result from components and systems not being adaptable to a wide range of operating temperatures. Another weakness is the single-mode failure detection mechanism used in such systems that fails to fulfill the requirements of being accurate and real-time responsive. Available systems utilize a mechanical failure system that works only very close to a potential disaster, which may lead to an electrical overload on the system. On the contrary, a non-smart preventive system can either work before failure or contribute to a malfunction of the system that causes the system to shut down. Such shutdowns can lead to significant repair and maintenance down time, which would not be acceptable in case of critical applications. It therefore becomes necessary to monitor and to prevent the malfunction in a real-time approach.

One of the problems with monitoring moving parts is that sensor elements are not readily connected to control equipment, which is generally stationary equipment that is external to the moving components. Connections can be made with wireless connections or by other sensing external to the moving components, such as optical sensing, but each external sensor is dependent on a clear communication channel. Such connections can be costly and create a point of potential failure. Moreover, such connections may be subject to interference, which can be inadvertent (e.g., noise) or intentional. Thus, a smart real-time prediction system for power transmission solving the aforementioned problems is desired.

SUMMARY

The smart real-time prediction system for power transmission provides monitoring and control of power or drive couplings in mechanical drive systems using one or more sensors at an interface of the coupling and an overload disengagement component at the coupling. A local sensor and actuation module having a wireless communication port receives signals from the sensors and uses the signals to monitor a load on the drive coupling. The local sensor and actuation module communicates with a control circuit using an Internet of Things (IoT) link. An overload disengagement circuit is associated with the monitored load and provides a disconnect signal responsive to a sensed overload condition, and communicates with the local sensor and actuation module using the IoT link, which responds to the disconnect signal to disengage the load. The control circuit uses a blockchain enablement protocol for communication and control via the IoT link. The local sensor and actuation module also provides an override capability in the event of a communication failure of the IoT link.

These and other features of the present disclosure will become readily apparent upon further review of the following specification and drawings.

BRIEF DESCRIPTION OF THE DRAWINGS

FIG. 2A is a partial perspective view showing a shaft coupling, broken away and partially in section, with extended drive teeth in a smart real-time prediction system for power transmission.

FIG. 2B is a partial perspective view showing the shaft coupling of FIG. 2A, broken away and partially in section, with the drive teeth retracted.

FIG. 2C is an end view of the shaft coupling of FIG. 2A, shown with the drive teeth extended.

FIG. 2D is an end view of the shaft coupling of FIG. 2A, shown with the drive teeth retracted.

Similar reference characters denote corresponding features consistently throughout the attached drawings.

DETAILED DESCRIPTION OF THE PREFERRED EMBODIMENTS

Figure 1:
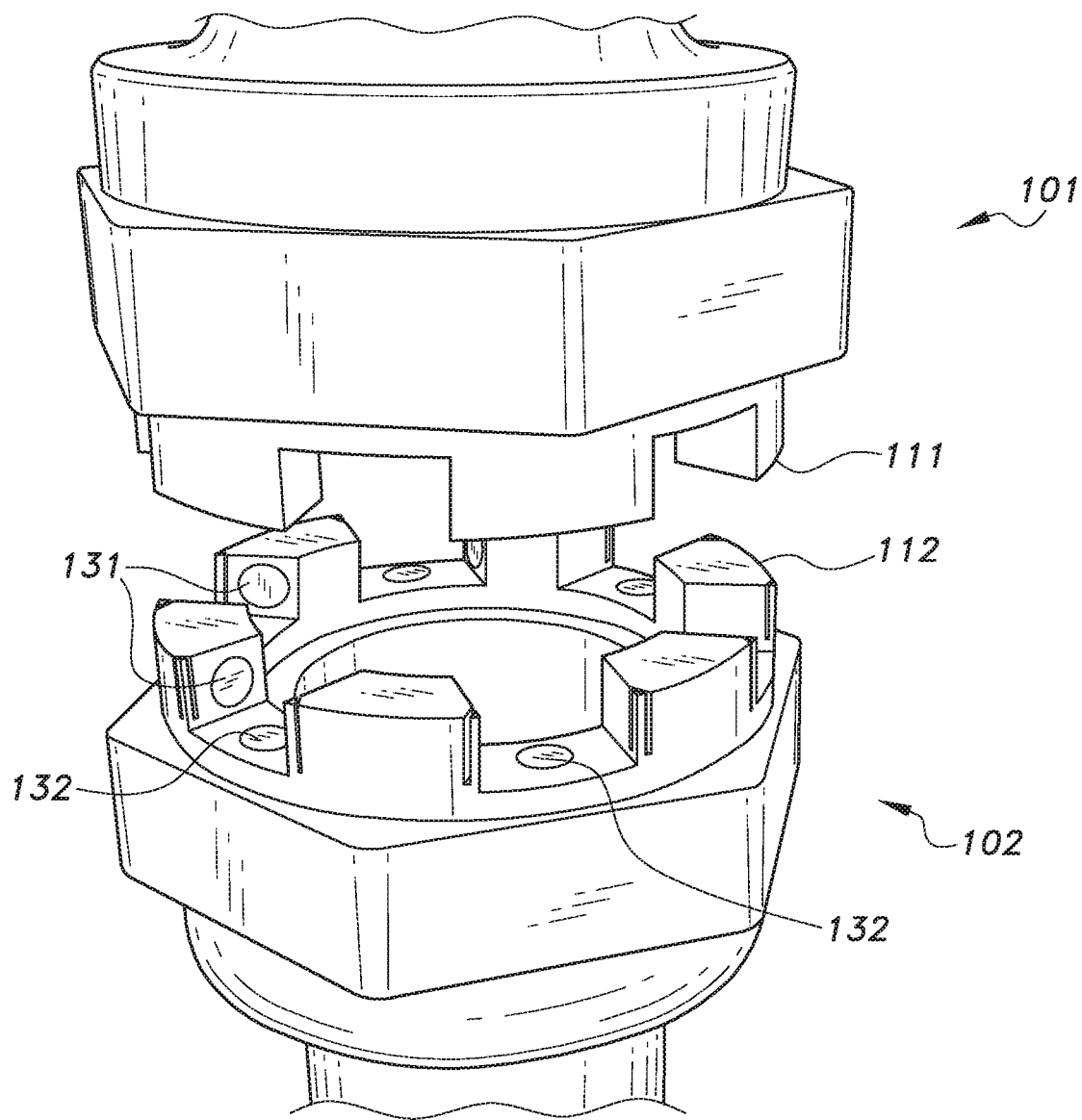
FIG. 1 is a partial perspective view of a shaft coupling with sensors in a smart real-time prediction system for power transmission.

The smart real time prediction system for power transmission includes the following subsystems: a misalignment detection subsystem; a torsional detection subsystem; a local microcontroller unit (MCU) with wireless communication capability; a micro-magnetic latching solenoid actuator; a progressive failure mechanism; an Internet of Things (IoT) gateway; and an IoT powered by blockchain technology as a communication medium. As used herein, the IoT refers to a network of physical objects ("things") having embedded sensors, software, network communications capability and other technologies for communicating data and connecting with other devices over the Internet to allow remote control and monitoring of the network of things by smart devices, such as smartphones.

The misalignment detection subsystem includes a set of force transducers attached to the driven part of a mechanical coupler of a power transmission system that detect shaft misalignment by measuring the axial forces distributed over multiple locations. The torsional detection subsystem includes a set of force transducers attached to the driven part of the mechanical coupler that measure the torsional force imparted to the coupling. The transducers of the detection subsystems are connected to a local MCU unit for data processing and communication. If the forces exceed certain predetermined limits, the local MCU unit will trigger a signal to the micro-magnetic latching solenoid to disengage the mechanism.

The micro-magnetic latching solenoid includes retractable jaws for disengaging the mechanism. The progressive failure mechanism includes a first section surrounding a second section of equal area. The system can be used with many different types of power transmission couplings.

The system provides smart real-time monitoring, early fault detection and damage prevention system used for power transmission mechanism that oversees the performance of the power transmission and identifies any alteration and triggers an intelligent prevention action (e.g., signaling the need for preventive maintenance) to preserve the process before any anticipated disaster or progressive malfunction. The disclosed design of the system includes smart transducers and a built-in MCU embedded within the system and interconnected in real time. The MCU provides local intelligence and acts to trigger the safety lock mechanism to protect the system.

The system provides smart real-time monitoring, early fault detection, and a damage prevention system used for a power transmission mechanism that oversees the performance of the power transmission and identifies any alteration or degradation in performance and triggers an intelligent prevention action to preserve the process before any anticipated disaster or progressive malfunction. The design of the disclosed system has been built using additive manufacturing technology to enable the integration of the smart, progressive failure function that prevents sudden failure and the associated cost as a consequence of the malfunction and breakdown. In addition to an auxiliary modular feature, the system is embedded with replaceable parts that can be plugged in and disassembled without sacrificing the system functionality. Additive manufacturing technology has been used to facilitate the integration of the system components with the smart real-time monitoring system. For example, the system may include smart transducers and a built-in MCU embedded within the system and interconnected in real-time. The MCU provides local intelligence and acts to trigger the safety lock mechanism to protect the system.

Mechanical power transmission is the transfer of energy from where it is generated to a place where it is used to perform work using simple machines, linkages, and mechanical power transmission elements. There is typically an electric motor or an internal combustion engine, which functions as a prime mover. The prime mover typically provides rotary driving torque via an input shaft-coupling combination. There are many ways to generate power, but sometimes it is impossible or impractical to generate power where it is needed or in the right form or direction or magnitude. Hence, electrical and mechanical power transmissions are vital for many engineering product designs. Mechanical power transmission and its elements are used for multiple purposes, for which monitoring and control are desired. Examples include conversion of generated power or energy into a useful form; physical constraints limiting power generation at the place where its used, and hence requiring transfer from source to a place where it is needed; mechanical power transmission components used to change direction and magnitude, such as speed or torque, or to change the type of energy; e.g., rotational to linear and vice versa.

The disclosed system may comprise (1) a safety module embedded with axial transducers and sensors to detect the axial force; (2) a safety module embedded with circumferential transducers and sensors to detect the torsional load transmitted; (3) micro-linear solenoid to disengage the system at overload conditions; (4) real-time monitoring system; and (5) a communication system.

In an engineering product design such as automation drives, machinery etc., power transmission and its elements make it possible to match the power source to its operating environment and condition of the working elements. Such power transmission elements are often used because they provide numerous advantages in a mechanical power transmission system. The arrangement provides transmit power efficiently. The use of separate components helps to split and distribute the power source to run several mechanisms, such as single motor running multiple conveyor belts. The arrangement facilitates changing rotational speeds and allows reversal of the rotational direction from the motor or conversion of rotational movement into linear reciprocating motion. Mechanical power transmission elements can be of different types, such as shafts and couplings, power screws, gears and gear trains, brakes and clutches, flexible element drives, such as belts, ropes and pulleys and chain and sprocket drives.

As discussed earlier, shafts and couplings are an integral part of the power transmission for modern age engineering product designs, such as machinery. Since power transmission shafts are widely used in almost all types of mechanical equipment design, the design is critical for safe and long life of the machines. Sub-components, such as couplings, gears, pulleys, sprockets, etc., are mounted onto a shaft to transmit power or rotation via the central portion of the component, called a hub, along with retention devices, such as keys and splines. The connection should ensure the connection transmits the load, power and rotation without slipping and within the accuracy requirement of the design. Types of connections and components required to be used along the shaft axis are dictated by the functional requirements of the product and depend on multiple factors, such as magnitude of torque, shaft size, rotation speed, and direction of rotation.

Couplings, also known as shaft couplings, are used to connect two shaft ends together to transmit both angular rotation and torque. The main design requirement for couplings and their retention devices are that the rated torque must be transmitted without slippage, premature failure, or in some cases, it needs to withstand misalignment. Mechanical power transmission couplings are typically divided into two broad categories, namely, rigid couplings and flexible couplings.

A power screw, also known as a leadscrew or translation screw, is a screw used as a power transmission linkage element in an engineering product, such as a machine, to translate rotational motion into linear motion. The large area of sliding contact between the male and female part of the screw threads provides large mechanical advantage via the small wedge angle. Power screws have many applications, such as linear leadscrews, machine slides, vises, screw jacks, mechanical press steering mechanisms, etc. Most common arrangements are set up such that the power screw rotates and the nut translates into linear motion along with the screw. Screw arrangements are also used in an opposite orientation, such as the screw jack, where the nut rotates and the screw moves linearly to raise the jack. These are not used for high power transmission because of significant frictional energy losses on screw threads, but are often used for low power, intermittent transmissions, such as low accuracy positioners.

Gear trains are multiple sets of gears that transmit power. A gear train is a mechanical power transmission system where gears are installed on shafts so the teeth of the mating gears engage and each roll on each other on its pitch circle diameter. Speed ratio and mechanical advantage of mating gears are defined by the pitch circle diameter ratio.

Conceptually, brakes and clutches are mechanically nearly indistinguishable, although functionally, in use, clutches are couplings that are used to engage and disengage the transmitted power between two connecting shafts rotating at different speeds on a common axis. The main function of a clutch is to bring both elements to a common angular velocity. A brake functions in a similar manner, except that one of the elements is fixed, so that, when actuated, the common angular velocity is zero. Although brakes and clutches are known for their automotive applications, there are also widely used in other applications, such as winches, mowers, hoists, washing machines, tractors, mills, elevators, and excavators.

Couplings can be divided into four classes according to their role in transmissions, i.e., rigid couplings, misalignment compensating couplings, torsionally flexible coupling, and shaft couplings. Power transmission couplings are widely used for modification of stiffness and damping in power transmission systems, both in torsion and in other directions (misalignment compensation). Many coupling designs use elastomers in multiple loading modes. Some couplings have joints with limited travel distances between the joint components accommodated by friction. Often, couplings have severe limitations on size and rotational inertia, etc. These factors make a good coupling design a challenging task, which can be helped by a clearer operational understanding of the coupling's functions. Stiffness values of couplings in both torsional and misalignment directions, as well as damping of couplings in the torsional direction, have a substantial, often determining, effect on the drive system dynamics. Torsionally flexible couplings are often used for tuning dynamic characteristics of the drive/ transmission by the intentional change of their stiffness and damping. Dynamic characteristics are described in terms of natural frequencies and/or damping.

Rigid couplings are used for rigid connection of precisely aligned shafts. Besides torque, they also transmit bending moments and shear forces if any misalignment is present, as well as axial force. The bending moments and shear forces may cause substantial extra loading of the shaft bearings. Principal application areas of rigid couplings are long shafting, space constraints preventing use of misalignment-compensating or torsionally flexible couplings, and inadequate durability and/or reliability of other types of couplings.

Misalignment-compensating couplings connect two members of a power transmission or motion transmission system that are not perfectly aligned. "Misalignment" means that components that are intended to be coaxial by design are not actually coaxial, due either to assembly tolerances or to deformations of subunits and/or foundations. The latter factor can be of substantial importance for large turbine installations (thermal/creep deformations leading to drastic load redistribution between the bearings) and for power transmission systems on non-rigid foundations (such as ship propulsion systems). Various types of misalignment as they are defined in AGMA standard 510.02 are well-known, referred to as, "parallel offset misalignment", symmetrical angular misalignment", non-symmetrical angular misalignment", and "combined angular-offset misalignment". It is noted that AGMA 510.02 has been superseded by ANSI/ AGMA 9009-D02 (reaffirmed July 2014), "Nomenclature for Flexible Couplings", and the newer standard uses slightly different terminology. If the misaligned shafts are rigidly connected, this leads to their elastic deformation, and thus to dynamic loads on bearings, to vibrations, to increased friction losses, and to unwanted friction forces in servo-controlled systems. Purely misalignment-compensating couplings have torsional deformations and misalignment-compensating deformations decoupled from movements associated with misalignments.

Torsionally flexible couplings are used to change dynamic characteristics (natural frequency, damping and character/ degree of nonlinearity) of a transmission system. The changes are desirable or necessary when severe torsional vibrations are likely to develop in the transmission system, leading to dynamic overload. Designs of torsionally flexible couplings usually are not conducive to compensating misalignments.

Shaft couplings connect one shaft to another shaft, such as the drive shaft of a motor to the shaft that turns the gears. Many different types of shaft couplings are used for making these types of connections. The shaft coupling makes the two shafts rotate without allowing one shaft to backlash. The use of couplings to connect shafts comes with its disadvantages.

Combination purpose couplings are also frequently used. These combine significant compensating ability with significant torsional flexibility. The majority of commercially available connecting couplings belong to this group. Since the torsional deformations and deformations due to misalignments are not separated/decoupled by design, changes in torsional stiffness may result in changes in misalignment-compensating stiffness, and vice versa.

One of the problems or disadvantages in using a shaft coupling is the possibility and effect of misaligning the shafts, then attaching a coupling. The stiff or rigid coupling damages the components more than other types of couplings when misalignment occurs, but all couplings will cause some damage. Even slight misalignment will create an excessive force on the coupling, shaft, and bearings, causing them to wear prematurely.

Backlash can occur with couplings because of misalignment and free play. Many times mechanics and designers will use a correcting coupling if they anticipate misalignment or excessive vibration. The correcting coupling works fine to decrease the damage of these shaft problems, but over time will create more problems. New correcting couplings have gaps that will fix any misalignment and vibration between shafts, but over time, these gaps will increase. As the gaps increase, more backlash develops between shafts. The backlash places more pressure and torque on the couplings, as well as the motor, bearings, and gears. You will begin to hear a loud, slapping noise when this backlash problem develops.

All types of couplings can loosen over their work life. The couplings are a wearable component and slowly loosen under normal operating conditions. Once the coupling begins being loosened, the velocity, drive speed, alignment, and vibration between shafts will be harmed or damaged. All of these problems create significant damage to the other components. An excellent periodic maintenance inspection can catch this disadvantage of using shaft couplings before the problem develops into a significant defect.

Shafts can vibrate during rotation. The vibration can loosen the shaft coupling, preventing the rotation between shafts from remaining constant. A loosened shaft coupling will cause one shaft to turn faster than the other, creating other problems, such as worn components or slow gear speed. If you can determine that misalignment and excessive vibration will occur between shafts, it is best to use a flexible coupling. The use of a flexible coupling will come with other disadvantages. The use of flexible couplings, such as a leaf spring coupling, can cause a loss of velocity between shafts. The loss of speed will influence the position of the shafts. Along with a loss of velocity, the shaft vibration will increase, causing the premature wearing of bearings and gears. You will also get more drive noise when the shafts are rotating.

FIG. 1 shows a shaft coupling with sensors. The drawing shows first and second interlocking mating drive couplings 101, 102. Drive coupling 102 is provided with side sensors 131 on the sides of teeth engaging the opposing coupler for sensing torque, and face sensors 132 in the flat between adjacent teeth for sensing axial pressure. Sensors 131, 132 can be provided on one or both of the mating drive couplings 101, 102. However, it is presumed that the forces on the opposing mated drive couplings 101, 102 would match, so it is really only necessary to provide torque sensors 131 on one of the couplings 101, 102. Likewise, it is only necessary to provide axial pressure sensors 132 on one of the couplings 101, 102.

FIGS. 2A-2D show decoupling configurations for a shaft coupling 201. FIG. 2A shows the coupling 201 with extended drive teeth 221. FIG. 2B shows the drive teeth 221 retracted. FIGS. 2C and 2D are end views showing the drive teeth 221 extended (FIG. 2C) and retracted (FIG. 2D). The coupling 201 is shown with micro-magnetic latching solenoid actuators 211. The extendable tooth mechanism, shown diagrammatically, comprises the tooth 221, an actuator 222, and a spring 223. The spring 223 biases the tooth 221 outward, so that when the actuator 222 is not activated, the tooth 221 is in position to engage its mating drive gear as shown in FIG. 1.

Figure 3:
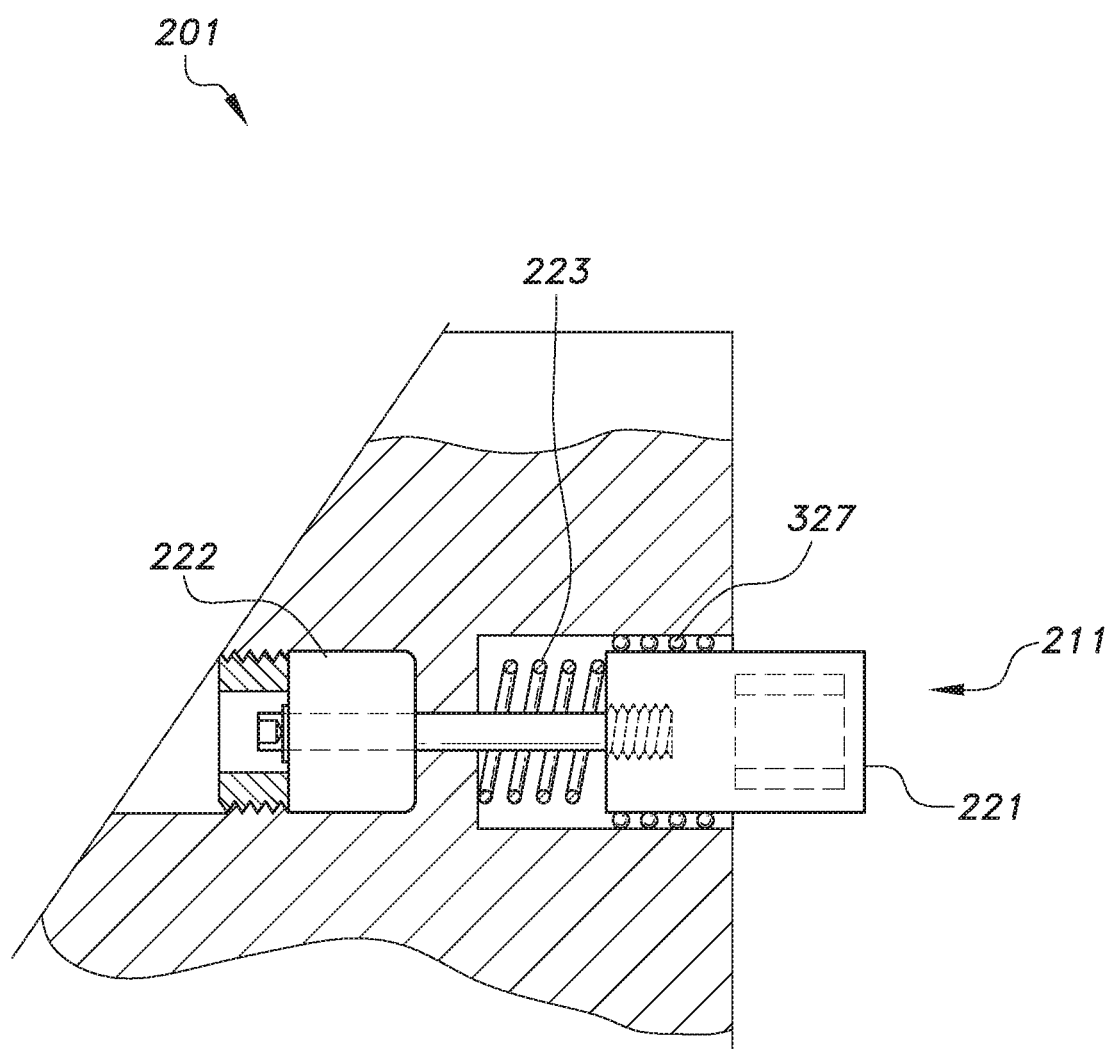
FIG. 3 is a partial perspective view, broken away and partially in section, showing details of a retractable drive tooth mechanism in a smart real-time prediction system for power transmission.

FIG. 3 is shows details of the micro-magnetic latching solenoid actuator's retractable drive tooth mechanism. The drawing shows the coupling 201, tooth 221, actuator 222 and spring 223. Also shown are guide bearings 327.

Figure 4:
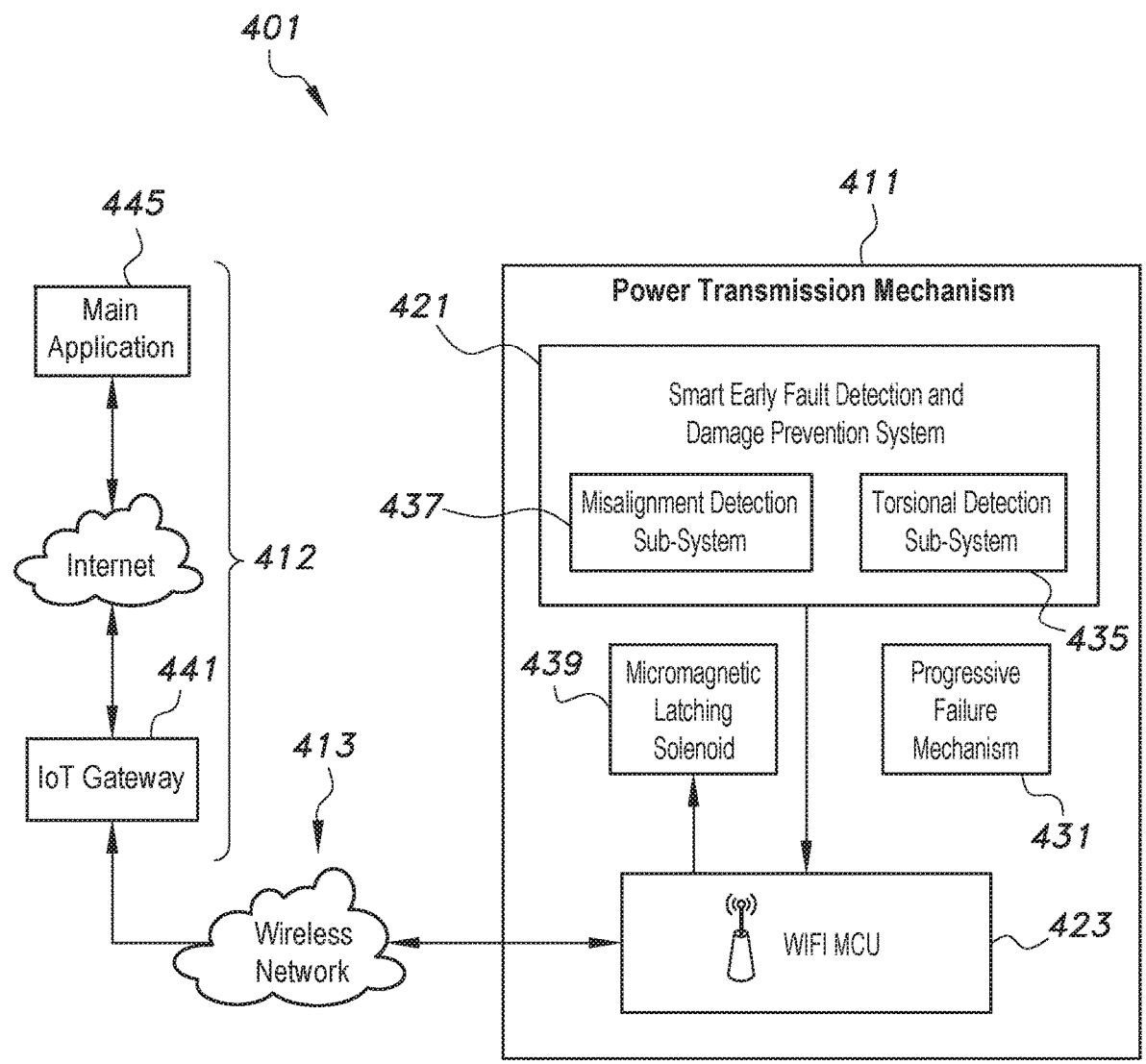
FIG. 4 is a block diagram showing a configuration of a sensor and control network, augmented with an internal fault detection controlling unit, in a smart real-time prediction system for power transmission.

FIG. 4 is a block diagram showing the configuration of an exemplary sensor and control network 401, augmented with an internal fault detection controlling unit. As shown in FIG. 4, central system components for the smart early fault detection and damage prevention system can be grouped into the following subsystems: a misalignment detection subsystem; a torsional detection subsystem; a local MCU with wireless communication capability; a micro-magnetic latching solenoid actuator; a progressive failure mechanism; and an IoT Gateway. The sensor and control network 401 comprises a local control module 411, an operational control section 412, and a wireless link 413.

The system is equipped with multiple smart IoT sensors, which transmit information regarding the health status of the power transmission mechanism through the local Microcontroller Unit (MCU). This information provides an early fault detection messaging system, which warns regarding the problem before it can escalate to a fatal breakdown. The local MCU is responsible for processing sensor data and transmitting it to the IoT gateway. In addition, the local MCU acts to disengage the mechanism if the risk exceeds a pre-configured threshold level. This adds a local intelligence and provides a fail-safe system in case of losing communication with the main control system. In an exemplary configuration, the system is implemented through a misalignment detection subsystem, and a torsional detection subsystem.

The misalignment detection subsystem is used to detect misalignment in the power transmission mechanism and prevents the consequences associated with the generated axial forces. It consists of a set of force transducers attached to the driven part. These transducers are used to detect shaft misalignment by measuring the axial forces distributed through multiple locations. In addition, it can be used in the alignment calibration process. The sensors are connected to the local MCU unit for data processing and communication. If the forces exceed a predetermined limit, the system will trigger a signal to the micro-magnetic latching solenoid to disengage the mechanism.

Sensor and control network 401 is augmented with an internal fault detection controlling unit. The torsional detection subsystem measures the efficiency of the power transmission mechanism by measuring the torsional force (as an estimation relative to the transmitted power), and comparing it with the input power in order to predict the efficiency. Lower efficiency results in higher power losses in the mechanism, which indicates a problem. This is considered to be an early fault detection function. Moreover, as a safety precaution, an action to disengage the mechanism is triggered when a predefined critical limit is reached to protect the system.

Power transmission module is local to the power transmission components being monitored and controlled, and comprise sensor and actuation module (smart early fault detection and damage prevention system) 421 and microcontroller unit (MCU) 423. Sensor and actuation module 421 comprises torsional detection subsystem 435 receiving inputs from torque sensors 131 (FIG. 1) and misalignment detection subsystem 437 receiving inputs from face sensors 132 (FIG. 1) sensing axial pressure. Output signals from sensors 131, 132 are processed by MCU 423, which communicates the sensed outputs via WiFi transmission. The WiFi transmission is transmitted to control section 412 via wireless link 413.

MCU 423 also controls micro-magnetic latching driver 439, which controls micro-magnetic latching solenoid actuators 211 (FIG. 2). The actuation is normally provided by signals received by MCU via the WiFi transmission, but in the event of a signal failure, progressive failure mechanism 431 is used to provide local override, and if predetermined limits are reached, the MCU 423 controls actuators 222 to cause actuators 222 to retract teeth 221.

Control section 412 comprises a wireless gateway 441, which communicates with a main controller application 445. Main controller application 445 responds to sensed conditions transmitted by the MCU 423, and provides control signals to the MCU 423. Communication through wireless link 413 is provided by an Internet of Things (IoT)-enabled blockchain for communication, as will be described, so that all communication used for controlling the coupling external to the sensor and actuation module 421 beyond the Network and Transport Layers is secure. It is possible to provide less secure communication in parallel so that operations can be monitored.

If forces detected by the torsional detection subsystem 435 exceed a predetermined limit, the system will trigger a signal to the micro-magnetic latching solenoid 439 to disengage the mechanism. The MCU 423, with its wireless communication capability, provides versatility. In addition to providing wireless connectivity, the MCU 423 adds local intelligence and provides data filtering and analysis before transmitting it to the IoT gateway. The presence of a local controller enables the system to respond to control signals locally obtained from progressive failure mechanism 431 and act to disengage the mechanism if the risk exceeds a pre-configured threshold level. That protects the critical and most expensive components and enables restoring functionality with minimal or no damage. This feature provides a fail-safe system in case of communication failure with the main control section 412.

Another feature that is adopted for the first time is a progressive failure mechanism 431, which is considered to be a safety back-up for the system in case all stages of the failure defenses do not work. The power transmission jaws are designed to have two areas that are subjected to the transmitted torsional load through the driver part to the driven part that is translated to a direct shear stress.

Therefore, maximum shear stress theory is used to design the jaw's areas. The maximum shear stress theory states that failure occurs when the maximum shear stress from a combination of principal stresses equals or exceeds the value obtained for the shear stress at yielding in the uniaxial tensile test.

The disengagement mechanism is achieved through micro-magnetic latching solenoid actuators 222. The primary function of the micro-magnetic latching solenoid actuator 222 is to pull the transmission sliding jaws in its active mode, disengaging the mechanism and providing a safety lock function to the system. The actuator 222 is controlled by the progressive failure mechanism 431 through the MCU 423, and it is activated to protect the power transmission mechanism in case of excessive forces detected by the sensors 131, 132, that exceed the predefined level and represent a high potential damage probability. This function has a positive impact on both the maintenance cost (by preventing the damage of the core expensive components), as well as limiting down time, since the power transmission mechanism can be engaged again after rectifying the problem without the need for major maintenance work. Controlling this safety feature locally enables the system to act independently, even in the case of network failure and losing the remote control functionality.

The progressive failure mechanism 431 is configured based on the direct shear stress theory that assumes that failure happens whenever the applied shear load on the jaws exceeds the maximum shear strength of the material.

The disclosed system can use Internet of Things (IoT) enabled blockchain for communication and control. Blockchain is a communication protocol. The blockchain is a growing list of records, called blocks, that are linked using cryptography, in which each block contains a cryptographic hash of the previous block, a timestamp, and transaction data, generally represented as a Merkle tree. An example of blockchain is found in Jo, et al., "Hybrid Blockchain and Internet-of-Things Network for Underground Structure Health Monitoring," Sensors, 18(12): 4268, 4 Dec. 2018.

IoT technology provides a communication platform that offers remote connectivity to apprise about the system condition, so the accumulated stored data can be further analyzed. The IoT gateway acts as a local data collection unit responsible for bridging between the intelligent sensors, actuators, and the Internet. The combination of the IoT gateway and blockchain provides connectivity, while providing secure communications and scalability for critical applications. The system can be used with many different types of power transmission couplings.

Despite all benefits that IoT introduces, it is necessary to address concerns regarding the privacy and security of the transmitted data, associated with a high cost for securing sensitive data and IoT centralized architecture that is considered to be a single point of failure, and would affect the security and scalability of IoT network. For this reason, and to overcome these drawbacks, a Distributed Ledger Technologies (DLT) system is introduced as a platform for IoT. The merge of these two big technologies (IoT and blockchain) is considered to be the next-generation Internet of Things platform that benefits from the connectivity, but is still secure and scalable for critical applications.

Smart sensors data is collected at the IoT gateway. It acts as a local data collection unit responsible for bridging between the intelligent sensors, actuators, and the Internet. The main functions of the gateway are that it pre-processes, cleans, and filters sensor data; uses edge computing to improve response times (dealing with large amounts of data generated by the sensors at the edge reduces communication latency and traffic by filtering and analyzing all data at the gateway and transfers only the required data); provides security for the IoT data by acting as the first line of defense; provides offline data storage in case of communication breakdown and continues the data stream when communication is re-established; and provides real-time control of devices and local decision making, which is critical in case of an emergency and the network is down.

IoT is considered to be a communication medium to provide remote connectivity to the system. However, IoT suffers from severe drawbacks that affect its implementation in critical applications. One major drawback is data security, where the data transmitted through the Internet will be exposed to attackers. It is known that in IoT systems, the connected embedded system, sensors, and actuators are simple devices lacking the security protocols and algorithms available in sophisticated methods, making them an easier target for attack. Another drawback is IoT's centralized architecture, representing a single failure point in which if the server fails or is down, the whole network will fail, as well as the scalability, which is a significant issue due to a large number of IoT nodes. To overcome these drawbacks, Distributed Ledger Technologies (DLT) is introduced as a platform for IoT. The merger of these two big technologies (IoT and blockchain) is considered to be the next generation Internet of Things platform that benefits from the connectivity, but is still secure and scalable for critical applications. The decentralized architecture and peer-to-peer transactions without the need for trusted parties open the door for implementing IoT for critical applications. In addition, the progressive failure mechanism 431 provides a fallback mechanism in the event of communication failure or other failures external to local control module 411.

IoT-enabled blockchain has particular advantages when used for power monitoring and control. The protocol is highly scalable and has a low resources requirement. The system can be enabled with zero fee transactions, and authenticity, integrity, and confidentiality of the data are assured. Data transfer is immutable and secure. Offline transactions are enabled.

The blockchain network consists mainly of nodes and clients. Nodes are considered to be the backbone or the core of the network, with read and write access capabilities to the Tangle (the immutable record of transactions). Nodes are connected together, forming the network. When any node receives an operation, it will be forwarded to all its neighbors for validation and updating this record in their local copy (ledger). The blockchain updating comprises maintaining addresses in the record; validating transactions; and attaching valid transactions to the ledger.

IoT devices are the clients that are connected to nodes, and they either implement transactions or store data. Each client has a unique identity. The data and transfer instructions are packaged into objects called transactions and are sent to a node.

Based on these requirements, both centralized and decentralized network architectures were studied, and the below Table 1 summarizes the advantages and disadvantages of both architectures:

TABLE 1

Comparison of centralized and decentralized architectures

| Architecture | Advantages | Disadvantages |
| --- | --- | --- |
| Centralized | Clients do not need to be sophisticated to establish a communication, nor need to make decisions, and hence it is more cost-effective in terms of simple client requirements | Single failure point and scalability issues |
| Decentralized | Highly scalable and eliminates the drawback of single failure point associated with the centralized architecture | Clients need to be more intelligent to communicate with their neighbors and this is associated with higher costs |

By reference to both the centralized and decentralized network architecture explained in the above Table 1, it is possible to conclude that the centralized network architecture suffers from scalability issues, as well as a single failure point, which does not satisfy requirements. However, the advantage is cost savings. In contrast, the decentralized architecture is highly scalable and has a fail-safe system, but is associated with higher implementation cost due to more computing capabilities being introduced in the clients to handle peer-to-peer communication.

The combination IoT and blockchain network design has been chosen as a mix of both architectures, which enables benefiting from the cost-effective centralized architecture at the client side, in addition to the decentralized architecture providing security, which is addressed by two means of protection, the first by the IoT gateway, which acts as the first line of defense, and the primary security strategy was achieved through the introduction of the blockchain technology.

To ensure a fail-safe system in case of network failure due to any reason, three layers of control are introduced, including (1) remote monitoring; (2) the IoT gateway, which collects, filters, and analyzes the data, which is stored temporarily, and in case of network failure, provides limited control functionality and resends data when the network is re-established; and (3) local control, for example, by the use of a battery-operated embedded controller in the mechanism itself, which is physically connected to the sensors and actuator. The local control provides a final fail-safe method and functions even if all network communication goes down, thereby protecting the system and preventing system damage.

The disclosed configuration uses a design strategy for the IoT network to comply with the requirement of critical applications Taking into consideration the need for critical and sensitive applications, such as precision systems used for aerospace, defense, nuclear, and petroleum applications, the design strategy was planned to take into consideration the need for following parameters: a scalable and robust performance system; data security, authenticity, and integrity; a fail-safe system; and a cost-effective system.

The system provides real-time early fault detection and damage prevention. The system monitors the condition of the power transmission so it would reveal realistic feedback on time. The system includes axial and torsional detection subsystems to detect and diagnose the misalignment, as well as the torsional overload. Accordingly, the smart system is going to disengage the jaws. A smart, progressive failure function prevents sudden failure and the associated cost as a consequence of the malfunction and breakdown. The system is therefore appropriate for critical applications, such as aerospace, defense, nuclear, and petroleum applications, where there is no tolerance for error or malfunction. Since the system provides fault tolerance, it reduces the costs associated with the breakdown.

An application programming interface (API) enables the integration of the smart system within existing applications. The system is embedded with replaceable sliding jaws that can be plugged-in and disassembled without sacrificing system functionality, so this will increase the lifetime of the system and reduce the cost of operation and maintenance. The system can be implemented using additive manufacturing technology to build a functional mechanism, as well as using metallic or high strength polymeric material embedded with fiber-reinforced composite, so it is practical, adaptable, and economical.

The system can be implemented for a wide range of operating temperatures without losing efficiency and performance. It can be incorporated with existing applications smoothly and will increase the level of the performance, reliability, and reduces service, maintenance, and operating costs.

Two procedures for early fault detection are provided. The first procedure is implemented by measuring the axial force, and the second by torsional force measurement. Three layers of control strategy were designed to ensure a fail-safe system in case of network failure due to any reason, and it is achieved by remote monitoring. This achieves the advantages of the IoT gateway and local sensing and control.

The IoT gateway collects, filters, and analyzes the data, which is stored temporarily in case of network failure and provides limited control functionality and resends data when network established. Local monitoring and control is implemented by the battery-operated embedded controller in the mechanism itself, which is physically connected to the sensors and to the actuator representing a final fail-safe method, and acts even if the network is down, protecting and preventing system damage.

It is to be understood that the smart real-time prediction system for power transmission is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A smart real-time prediction system for power transmission, comprising: a local actuation sensor having a wireless communication port; a load monitoring sensor configured to monitor load on a drive coupling, the load monitoring sensor being in electrical communication with the load actuation sensor using an Internet of Things (IoT) link to define a control circuit wherein the drive coupling comprises an axial connector and a toothed connection providing engagement across a drive connector through a gear teeth, thereby providing rotational power transmission, further wherein the load monitoring sensor senses the force across the drive coupling; a first disengagement circuit associated with the monitored load and configured to provide a disconnect signal responsive to a sensed overload condition, wherein the first disengagement circuit causes the drive coupling to disengage responsive to the sensed overload condition, further wherein the first disengagement circuit is responsive to a sensed misalignment condition and causes the drive coupling to disengage in response thereto; and the local actuation sensor comprising a second disengagement circuit, the second disengagement circuit being in electrical communication with the control circuit using the IoT link and being responsive to the disconnect signal to disengage the load, the second disengagement circuit causes the drive coupling to disengage responsive to the sensed overload condition, wherein the second disengagement circuit is responsive to a sensed misalignment condition and causes the drive coupling to disengage in response thereto, further wherein the second disengagement circuit causes the drive coupling to disengage the toothed connection by withdrawing the gear teeth from engagement or by withdrawing one part of the toothed connection from a second part of the toothed connection responsive to the sensed overload condition or the sensed misalignment condition; wherein the control circuit uses a blockchain enablement protocol for communication with the local actuation sensor via the IoT link.

2. The smart real-time prediction system of claim 1, further comprising a local signal link between the control circuit and the first disengagement circuit providing an override capability in the event of a communication failure of the IoT link.

3. The smart real-time prediction system of claim 1, further comprising: a local signal link between the control circuit and the load monitoring sensor; and a local signal link between the control circuit and the first disengagement circuit, wherein the local signal links provide an override capability in the event of a communication failure of at least one of the IoT link communicating with the load monitoring sensor and the IoT link communicating with the first disengagement circuit.

4. A monitoring system for mechanical drive systems, the monitoring system comprising: a drive coupling, the drive coupling comprising an axial connector and a toothed connection providing engagement across the axial connector through a gear teeth, thereby providing rotational power transmission; a load monitoring sensor configured to monitor load on and force across the drive coupling; a first disengagement circuit associated with the monitored load and configured to provide a disconnect signal responsive to a sensed overload condition; and a second disengagement circuit responsive to the disconnect signal to disengage the load, wherein the second disengagement circuit causes the drive coupling to disengage the toothed connection by withdrawing the gear teeth from engagement or by withdrawing one part of the toothed connection from a second part of the toothed connection responsive to at least the sensed overload condition.

5. The monitoring system of claim 4, further comprising: the drive coupling further comprising a drive system wireless communication module controller configured to communicate the monitored load; a control circuit wirelessly connected to the drive system wireless communication controller, and monitoring sensed load conditions and communicating with the first disengagement circuit through the drive system wireless communication controller to provide the disconnect signal to the drive coupling to disengage the drive coupling responsive to a sensed overload condition and to disengage responsive to a sensed misalignment condition.

6. The monitoring system of claim 5, further comprising the load monitoring sensor comprising a misalignment detection system comprising a set of force transducers attached to the drive coupling and a circuit responsive to signals from the force transducers detecting misalignment of the drive coupling by measuring the axial forces distributed over multiple locations.

* * * * *